(12) United States Patent
Shimura et al.

(10) Patent No.: US 6,368,552 B1
(45) Date of Patent: Apr. 9, 2002

(54) WATER TREATING AGENT AND WATER TREATING METHOD

(75) Inventors: Yukimasa Shimura, Sagamihara; Shiro Taya, Hachiouji, both of (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 09/646,476

(22) PCT Filed: Jan. 19, 2000

(86) PCT No.: PCT/JP00/00220

§ 371 Date: Sep. 15, 2000

§ 102(e) Date: Sep. 15, 2000

(87) PCT Pub. No.: WO00/44962

PCT Pub. Date: Aug. 3, 2000

(30) Foreign Application Priority Data

Jan. 27, 1999 (JP) .............................................. 11-018927
Oct. 29, 1999 (JP) .............................................. 11-310099

(51) Int. Cl.$^7$ ................................................ C23F 11/00
(52) U.S. Cl. ............................ 422/14; 422/14; 422/28; 422/30; 149/46; 149/60
(58) Field of Search .............................. 422/14, 28, 30; 149/46, 60

(56) References Cited

U.S. PATENT DOCUMENTS 3,772,893 A * 11/1973 Eilers ............................ 61/36
4,964,929 A * 10/1990 Beyeler et al. ................ 149/60

* cited by examiner

Primary Examiner—Robert J. Warden, Sr.
Assistant Examiner—Imad Soubra
(74) Attorney, Agent, or Firm—Flynn, Thiel, Boutell & Tanis, P.C.

(57) ABSTRACT

A water treating agent which has a high safety and is to be used for preventing corrosion and scale formation in the feed water lines and steam generation system and for preventing corrosion in the steam condensate lines in plants, boilers and steam generators. The water treating agent contains volatile components capable of being transferred from an aqueous phase to a steam phase and to a steam condensate phase and exhibiting a high ability for preventing scale formation and corrosion at a lower dose, even for a feed water containing carbonates and bicarbonates, together with its advantageous feature of capability of application to the feed water in a form of a single aqueous solution due to its high water-solubility, without causing separation and deposition upon dilution with water, wherein the water treating agent contains eugenol, isoeugenol and lactones represented by the formula (1) given below and, if required, a neutralizing amine and erysorbic acid or its salt, together with, if necessary, an alkali agent and/or a water-soluble polymeric compound:

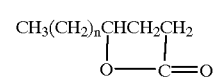

(1)

in which n is an integer of 4 to 9.

20 Claims, No Drawings

WATER TREATING AGENT AND WATER TREATING METHOD

FIELD OF THE INVENTION

The present invention relates to a water treating agent which has a high safety and is to be used for preventing corrosion and scale formation in the make-up water supply system and steam generation system and for preventing corrosion in the steam condensate system in various plants and in steam generating apparatuses, such as boilers and steam generators. The invention also relates to a water treating method using such water treating agent.

BACKGROUND OF THE INVENTION

In apparatuses and plants where steam is generated, such as boilers and steam generators (in the following, referred to sometimes as steam generating units), occurrence of corrosion in the steam condensate system where steam and the condensate contact with metal surfaces of the condensate system may often be seen, since oxygen and carbon dioxide contained in the feed water and carbon dioxide formed by thermal decomposition of carbonates and bicarbonates included in the feed water are transferred to the steam system. In boiler water internal treatment in recent years, cases not employing any deoxidizing treatment come to be found frequently, in which almost all the dissolved oxygen in the feed water is transferred to the steam condensate system and the corrosion in the steam condensate system becomes more facilitated. As a result, there occurs possibilities of increase in the energy loss due to possible steam leakage and of increase in the cost and time for maintenance in the pipe lines, heat exchangers and so on.

For preventing such corrosion problems, a countermeasure has been employed, in which a neutralizing amine having functions of corrosion prevention and volatility or a long chain aliphatic amine is introduced into the feed water or into the steam condensate line. In particular, an intense request becomes posed on the innoxiousness of steam in recent years and, therefore, a special regard has to be paid on a high safety of the chemicals to be employed. Thus, cyclohexylamine, diethylethanolamine and morpholine for the neutralizing amine and octadecylamine for the long chain aliphatic amine have found wide use as additives to be incorporated in corrosion prevention in boilers, which have been accepted in the FDA standard in the USA and in the FDBCS standard in Canada. The neutralizing amine functions to prevent corrosion by neutralizing carbon dioxide in the steam condensate system, whereas the long chain aliphatic amine reveals its corrosion preventive function by forming a water-repellent anticorrosive film on the internal surface of steam condensate lines. Also, there is a technique of using a composite anticorrosive agent exhibiting both of these functions, in which a neutralizing amine and film-forming amine are incorporated in a single liquid medium.

However, in the case of an internal treatment of boiler water without deoxydizing treatment and with the corresponding presence of a large amount of dissolved oxygen in the steam condensate lines transferred from the boiler, any sufficient corrosion preventive effect is not attained by neutralizing the dissolved carbon dioxide with a neutralizing amine, since the corrosion in the steam condensate line proceeds with a rate-determining step by oxygen migration. For achieving a sufficient corrosion preventive effect using only a neutralizing amine, it is necessary to employ an amount of a neutralizing amine as to reach a pH of 9 or higher. However, the least tolerable concentration of neutralizing amine in steam is prescribed by the FDA standard in the USA and this prescription is applied also in Japan. In the case of using a raw water or a softened water as the feed water, carbon dioxide formed by thermal decomposition of a carbonate and bicarbonate in the feed water is brought into the steam and requires so much of the neutralizing amine to be neutralized that the amount permitted by the FDA standard may be insufficient to reach a high enough pH value, whereby a sufficient corrosion preventive effect is not attained. When a neutralizing amine is used in an amount greater than that prescribed by the FDA standard, a high concentration of carbonate salt of the amine will be formed in the steam condensate system, which may cause a problem of clogging of dead-stop lines, such as a pressure gauge line and drain trap line, by being accumulated therein at high concentration.

When a long chain aliphatic amine is used, this will be adsorbed on the internal surfaces of the steam condensate lines to form a protective film to effect corrosion prevention. Here, a considerable dilatoriness has to be endured for sufficient building-up of the protective film on peripheral or terminal parts of the condensate lines. In particular, in a plant installing a steam condensate system having greater internal surface areas of the lines or operating with smaller amounts of steam to be generated, some three months or more may occasionally be required for establishing a sufficient protective anticorrosive film, permitting some corrosion to proceed before the anticorrosive film is established. In the case of an internal boiler water treatment without deoxidation and, thus, having a large amount of dissolved oxygen brought into the condensate system, more retardation may be caused due to the occurrence of considerable corrosion in the condensate lines, before establishment of such an anticorrosive film, bringing about a possible problem of an insufficient corrosion preventive effect even after the establishment of the anticorrosive film due to incomplete suppression of oxygen cell corrosion. Moreover, a long chain aliphatic amine is present at normal temperatures as a solid matter and is difficultly soluble in water and, therefore, it is brought into practical use in the form of an emulsion. While such an emulsion itself is, in general, considerably stable, separation and deposition of the emulsion may sometimes occur after a prolonged standstill, especially, when the emulsion is diluted at a high dilution ratio, which may occasionally cause deposition and aggregation of the amine after introduction of the emulsion into the feed line, resulting in a possible clogging of a strainer or the like in the feed line. Even in a condensate line in which steam is completely condensed into the liquid phase, deposition of the long chain aliphatic amine may occur and similar problems of clogging of the line due to aggregate of the amine may be brought about.

On the other hand, as a water treating agent of high safety for boiler feed water, one in which an aldonic acid of a heptose or hexose, a salt thereof or a deltalactone is incorporated together with an aliphatic carboxylic acid is proposed (See Japanese Patent Kokai Hei 10-130874). Here, it is not able to attain sufficient corrosion preventive effect by a sole use of the aldonic acid of a heptose or hexose, its salt or the deltalactone, in addition to a lower tendency of being transferred to the steam phase, so that it was not able to be used as an anticorrosive agent for steam condensate lines.

An object of the present invention is to provide a water treating agent which is highly safe and can be used as an alternative for the neutralizing amine and long chain aliphatic amine of the prior art and which is capable of being brought into the steam phase and into the condensate due to its high volatility and exhibits a high corrosion preventive effect even for a feed water containing carbonates and biocarbonates, without causing accumulation in the system to be treated, and to provide a water treating method using this water treating agent.

Another object of the present invention is to provide a water treating agent which can prevent the occurrence of corrosion and scale formation in the feed water system and the steam generating system as well as prevent the occurrence of corrosion in the steam condensate system, wherein the water treating agent is highly safe and can be brought into the steam phase and into the steam condensate due to its high volatility and which exhibits a high corrosion preventive effect, even for a feed water containing carbonates and bicarbonates at a lower dose, and can be introduced into the feed water as a single liquid mixture without causing separation or deposition even by dilution with water due to its high water-solubility and without causing accumulation in the system to be treated, and to provide a water treating method using this water treating agent.

DISCLOSURE OF THE INVENTION

The present invention resides in the following water treating agent and water treating method:

(1) A water treating agent, comprising at least one compound selected from the group consisting of eugenol, isoeugenol and lactones represented by the following formula (1), namely,

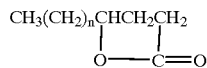

(1)

in which n is an integer of 4 to 9.

(2) A water treating agent, comprising at least one compound selected from the group consisting of eugenol, isoeugenol and lactones represented by the formula (1) given above; a neutralizing amine; and erysorbic acid or its salt.

(3) The water treating agent as defined in the above (2), wherein the weight proportion of [eugenol and/or isoeugenol and/or lactone(s)]/[neutralizing amine]/[ferysorbic acid or its salt] of the water treating agent is in the range from 1/0.1/0.1 to 1/500/500.

(4) The water treating agent as defined in the above (2) or (3), wherein it comprises further an alkali reagent.

(5) The water treating agent as defined in the above (4), wherein the weight proportion of [eugenol and/or isoeugenol and/or lactone(s)]/[alkali reagent] of the water treating agent is in the range from 1/0.01 to 1/500.

(6) The water treating agent as defined in either one of the above (2) to (5), wherein it comprises further a water-soluble polymeric compound.

(7) The water treating agent as defined in the above (6), wherein the weight proportion of [eugenol and/or isoeugenol and/or lactone(s)]/[water-soluble polymeric compound] of the water treating agent is in the range from 1/0.01 to 1/300.

(8) A water treating method, comprising introducing into the water to be treated a water treating agent comprising at least one compound selected from the group consisting of eugenol, isoeugenol and lactones represented by the above formula (1).

(9) A water treating method, comprising introducing into the water to be treated a water treating agent comprising at least one compound selected from the group consisting of eugenol, isoeugenol and lactones represented by the formula (1) given above; a neutralizing amine; and erysorbic acid or its salt.

(10) The water treating method as defined in the above (9), wherein the weight proportion of [eugenol and/or isoeugenol and/or lactone(s)][neutralizing amine]/[erysorbic acid or its salt] of the water treating agent is in the range from 1/0.1/0.1 to 1/500/500.

(11) The water treating method as defined in the above (9) or (10), wherein the water treating agent comprises further an alkali reagent.

(12) The water treating method as defined in the above (11), wherein the weight proportion of [eugenol and/or isoeugenol and/or lactone(s)]/[alkali reagent] of the water treating agent is in the range from 1/0.01 to 1/500.

(13) The water treating method as defined in either one of the above (9) to (12), wherein the water treating agent comprises further a water-soluble polymeric compound.

(14) The water treating method as defined in the above (13), wherein the weight proportion of [eugenol and/or isoeugenol and/or lactone(s)]/[water-soluble polymeric compound] of the water treating agent is in the range from 1/0.01 to 1/300.

The water system to be treated by the treating agent according to the present invention is one which suffers from corrosion problem and scale formation. In particular, the water treating agent according to the invention provides for treating water lines and steam condensate lines of steam generating systems, such as boilers and steam generators as well as plants, in which steam is generated and is cooled into condensate and which are constructed of, such as, iron and steel subject to corrosion and scale formation thereon, no matter how the water quality and the kind of the system are. Among them, the present invention is applicable especially to feed water lines, steam lines and steam condensate lines of low and middle pressure boilers and steam generators using softened waters and raw waters containing carbonates and bicarbonates for their feed waters.

The lactones as well as eugenol and isoeugenol to be incorporated in the water treating agent according to the present invention are represented by the formula (1), given previously, as well as by the formulae (2) and (3) as given below, respectively, all of which are innoxious and have been allowed in Japan as food hygienic additives:

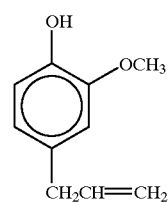

(2)

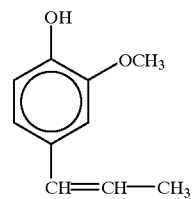

(3)

All the above chemicals exhibit volatility and volatilize from the aqueous phase into the steam phase and are transferred further to the condensate system by condensation, when they are introduced into the water system to be treated, in particular into the feed water line, to thereby attain corrosion prevention of internal surfaces of not only the feed water system but also the steam generating system and the steam condensate system. In case a steam condensate system is to be treated for preventing corrosion thereof, these chemicals may be introduced into the system either individually for each or in a combination of two or more at any voluntary site from the feed water line to the steam condensate line, while it is favorable to introduce them into the feed water line.

These chemicals can be employed each at a concentration effective for corrosion prevention, wherein the dose amount is determined for each specific system in accordance with each specific level of prevention of corrosion, while it may, in general, be in the range from 0.001 to 400 mg, preferably from 0.01 to 200 mg, more preferably from 0.02 to 100 mg per liter of the feed water into which they are introduced. Each of these chemicals can be present as a solution when the concentration is low and, thus, it is recommended to prepare preliminarily a solution of low concentration and introduce it into the feed water in such a rate that the concentration mentioned above will be reached in the feed water. It is also possible to prepare an emulsion or a solution of each of the chemicals using, for example, a suitable emulsifier or an acceptable solvent, and supplying such an emulsion or solution to the feed water.

All the above compounds have sufficient innoxiousness for permitting them to be present in the steam and in the condensate without jeopardizing hygienic and environmental safety. These chemicals can provide sufficient corrosion preventive effect even if not concurrently used with other chemicals, so that a high degree of safety can be reached in wide varieties of application fields.

The function of corrosion prevention by these compounds may presumably be due to a mechanism which is different from that of conventional neutralizing amine in which the corrosion preventive effect is attained by a mere neutralization of the emvironmental medium. They reveal a high corrosion preventive function even used in a smaller amount and do not bring about any problem of, such as, clogging of pipe lines due to accumulation thereof etc.

When only corrosion prevention of steam and condensate systems is contemplated, it is possible to attain the corrosion prevention only using these compounds, since such a corrosion preventive effect can be reached simply by introducing these chemicals into the steam line or condensate line. However, it is more favorable to use these chemicals in combination with other water treating components, such as neutralizing amine, erysorbic acid and/or its salt and so on, in order to formulate them as an integrated water treating formulation.

The neutralizing amine to be incorporated in the water treating agent according to the present invention as a component other than the above-mentioned compounds has a volatility and attains a corrosion preventive effect by neutralizing acids originated from gasifiable solutes in the feed water, such as carbon dioxide etc. While it is permissible to incorporate conventional neutralizing amines in the water treating agent according to the present invention, use of those which are accepted in accordance with the FDA standard or the FDBCS standard mentioned above is preferred. Preferred examples of such neutralizing amine include cyclohexylamine, 2-amino-2-methyl-1-propanol, diethylethanolamine, morpholine and mixtures of them, though there is no limitation therefor.

Erysorbic acid, in another name, isoascorbic acid, has been employed from the past as a reducing agent. As the salt of erysorbic acid to be employed according to the present invention, there may be exemplified a salt obtained by neutralizing erysorbic acid with sodium hydroxide, a salt obtained by neutralizing erysorbic acid with potassium hydroxide, a salt obtained by neutralizing erysorbic acid with ammonia and a salt obtained by neutralizing erysorbic acid with a neutralizing amine. Erysorbic acid and the salts of erysorbic acid may each be employed either solely or in a combination of two or more of them.

The weight proportion of the intrinsic component, namely, eugenol and/or isoeugenol and/or lactone(s), versus the amine component, namely, the neutralizing amine, versus the reducing component, namely, erysorbic acid and/or its salt, represented hereafter by [eugenol and/or isoeugenol and/or lactone(s)]/[neutralizing amine]/[erysorbic acid or its salt], may favorably be in the range from 1/0.1/0.1 to 1/500/500, namely, in the range of 1/(0.1 to 500)/(0.1 to 500), preferably in the range from 1/1/1 to 1/100/100, namely, in the range of 1/(1 to 100)/(1 to 100), more preferably from 1/2/2 to 1/50/50, namely, in the range of 1/(2 to 50)/(2 to 50).

The compounding proportion of each component of the water treating agent and the dose amount of the water treating agent may be chosen adequately in accordance with each specific water quality, such as the concentration of dissolved oxygen, M-alkalinity and so on, of the feed water of the system to be treated, such as boiler etc., while it is preferable to predetermine the component proportion and dose amount so that the concentration of each of the intrinsic component, the amine component and the reducing component in the feed water will reach a value in the range from 0.001 to 400 mg/liter, preferably from 0.01 to 200 mg/liter and more preferably from 0.02 to 100 mg/liter.

The water treating agent according to the present invention may favorably contain, in addition to the above three components, further an alkali reagent component. For the alkali reagent, there may be enumerated, for example, sodium hydroxide, potassium hydroxide, sodium carbonate and potassium carbonate, though not limited only to them. The compounding proportion of the alkali reagent may favorably be so selected, that the weight proportion of the intrinsic component relative to the alkali reagent component, namely, [eugenol and/or isoeugenol and/or lactone(s)]/[alkali reagent], will be in the range from 1/0.01 to 1/500, preferably from 1/0.1 to 1/200, more preferably from 1/1 to 1/100. The dose amount of the alkali reagent may adequately be varied in accordance with each specific feed water quality and with the system using such feed water.

The water treating agent according to the present invention may favorably contain, in addition to the above-mentioned intrinsic component or in addition to the combination of the alkali reagent component with the intrinsic component, further a water-soluble polymeric compound component. As the water-soluble polymeric compound, there may be enumerated, for example, polyacrylic acid, polymaleic acid, polymeth-acrylic acid, copolymer of acrylic acid with acrylamide, copolymer of acrylic acid with hydroxyallyloxypropane-sulfonic acid, copolymer of acrylic acid with 2-acryl-amido-2-methylpropanesulfonic acid and salts of them, though not restricted thereto only. The number-average molecular weight of these water-soluble polymeric compounds may favorably be in the range from 100 to 100,000, preferably from 200 to 50,000, more preferably from 500 to 10,000.

The compounding proportion may be favorable chosen in such a manner that the weight proportion of the intrinsic component versus the water-soluble polymeric compound (s), namely, [eugenol and/or isoeugenol and/or lactone(s)]/

[water-soluble polymeric compound(s)] will be in the range from 1/0.01 to 1/300, preferably from 1/0.1 to 1/100, more preferably from 1/1 to 1/50. The dose amount of the water-soluble polymeric compound(s) in the water to be treated may adequately be so determined that its concentration in the feed water will be in the range from 0.1 to 500 mg/liter, preferably from 1 to 200 mg/liter, more preferably from 5 to 100 mg/liter.

The water treating agent according to the present invention may contain, in addition to the components mentioned above, deoxidant(s), such as hydrazine, sodium sulfite, saccharides, diethyl-hydroxylamine and 1-aminopyrrolidine; corrosion inhibitor; dispersant; chelating agent; scale formation inhibitor and mixtures of them.

The water treating agent according to the present invention may be introduced into the feed water either individually for each component or in a form of a mixture, so long as the effective concentration of each component in the feed water is reached. As a convenient practice, the water treating agent may be in a form of an integrated single solution to be introduced into the feed water.

The water treating agent according to the present invention can be formulated in one single solution by introducing the components into an adequate amount of water, since the water treating agent according to the present invention can easily be dissolved in water. The so-obtained single integrated solution of the water treating agent may have a content of the water treating agent solid matter in the range from 1 to 80% by weight, preferably from 10–70% by weight and more preferably from 20 to 60% by weight, which can be introduced into the feed water directly as such. The water treating agent according to the present invention may favorably be introduced into the feed water.

While the solubilities of eugenol, isoeugenol and the lactones in water are relatively low, they can be increased by causing the neutralizing amine component to be present concurrently therein in accordance with one aspect of the present invention, whereby no phenomenon of separation nor deposition will occur even when the water treating agent is diluted at any voluntary dilution. Thus, it is now made possible to prepare an aqueous solution of the water treating agent of a higher concentration and to dose it as one single solution of the water treating agent to the feed water line of a steam generating apparatus using a dosing pump under dilution with water. Eugenol and/or isoeugenol and/or the lactone(s) are brought to the steam condensate system together with the neutralizing amine, where they function to neutralize the dissolved carbon dioxide in the steam drain water to elevate the pH thereof to thereby reveal a corrosion preventive action on the steam condensate lines, wherein the corrosion preventive activity is increased by their concurrent use.

Erysorbic acid and its salt provide a prompt removal of the dissolved oxygen in the feed water, whereby the amount of the dissolved oxygen transferred therefrom to the steam condensate system is decreased to thereby attain reduction of the corrosion due to the dissolved oxygen in the steam condensate lines. A synergistic effect is attained by the concurrent actions of the neutralizing amine and of erysorbic acid or its salt, wherein the corrosion preventive function of eugenol, isoeugenol or the lactone is improved.

Since erysorbic acid or its salt reveals at a lower temperature its deoxidizing action more highly under alkaline condition than under neutral condition, a superior deoxidizing action will be revealed, when used together with the alkali reagent, also on the feed water line which remains at a lower temperature. Corrosion in the heat exchangers, economizers and so on installed in a boiler plant at portions preceding to the boiler operating as the steam generating apparatus can be suppressed and, at the same time, occurrence of secondary corrosions on the heat transfer surfaces of the boiler due to adhesion thereon of iron oxide particles brought into the boiler is also decreased.

By further incorporating the water-soluble polymeric compound in addition to the components described above in the composition of the water treating agent according to the present invention, deposition and adhesion of scale and iron oxide particles on the heat transfer surfaces of boiler are prevented by the dispersing action of the water-soluble polymer compound, whereby corrosion due to the so-called oxygen concentration cell mechanism can be prevented. In this manner, occurrence of corrosion in the steam condensate lines, in the boiler body and in the feed water lines guided to, such as, the heat exchangers and economizers installed preceding the boiler can be reduced by using one single solution of the water treating agent.

As described above, a water treating agent capable of preventing corrosion in the steam condensate lines, which is highly innoxious, volatile and, thus, can be transferred to the steam phase and to the condensate and which exhibits higher corrosion preventive function even in a feed water containing solutes of carbonate and bicarbonate without showing accumulation of the treating agent in the apparatus to be treated, can be obtained according to the present invention, by incorporating therein eugenol and/or isoeugenol and/or the lactone(s) explained above, in lieu of the conventional neutralizing amine or the long chain aliphatic amine.

According to the present invention, further, a water treating agent capable of preventing occurrence of corrosion and scale formation in the feed water lines and in the steam generating system as well as preventing occurrence of corrosion in the steam condensate lines, which is highly innoxious, volatile and, thus, can be transferred to the steam phase and to the condensate and which exhibits higher corrosion preventive function at a lower dose amount even in a feed water containing solutes of carbonate and bicarbonate without showing accumulation of the treating agent in the apparatus to be treated, can be obtained, by incorporating therein eugenol and/or isoeugenol and/or the lactone (s) as the intrinsic component; a neutralizing amine as the amine component; and an erysorbic acid or its salt as the reducing component.

When an alkali reagent is incorporated further, in addition to the above-mentioned components of the water treating agent, it becomes possible to further reduce the corrosion rate by introducing the water treating agent into the feed water lines guided to, such as heat exchangers etc. disposed preceding the boiler body, in order to effect deoxidation, since the deoxidizing function at lower temperature is increased thereby.

When a water-soluble polymeric compound is further incorporated in the composition of the water treating agent, in addition to the constituent components given above, the corrosion preventive effect can further be increased due to prevention of adhesion and deposition of scale and iron oxide particles on the heat transfer surfaces.

THE BEST MODE FOR EMBODYING THE INVENTION

Below, the present invention will further be described by way of Examples and Comparative Examples, in which all indications by % refer to those based on weight.

EXAMPLES 1 to 5 AND COMPARATIVE EXAMPLE 1

Each sample solution from aqueous solutions each containing 200 mg/liter of either one of the chemicals given in Table 1, of which pH had been adjusted to 11.5 with sodium hydroxide, was charged in an autoclave having a capacity of 1.5 liters and was purged by bubbling with nitrogen gas at a rate of 1.5 liters per minute for 30 minutes, whereupon the autoclave was sealed and heated to elevate the temperature up to 200° C. over a period of 1 hour. Each 50 ml of samples were taken from the steam phase and from the liquid phase directly after the temperature had reached at 200° C., which were analyzed for the concentration of the chemical on a gas chromatography.

The ratio of the concentration of chemical in the steam phase versus the concentration of chemical in the liquid phase was calculated. A similar examination was performed in Comparative Example 1 for glucono-δ-lactone which is a delta lactone of an aldonic acid of hexose and is disclosed in Japanese Patent Kokai Hei-10-130874. The results of these Examples and of Comparative Example are recited in Table 1.

TABLE 1

| | Chemicals tested | Conc. (mg/l) of chemical in steam | Conc. (mg/l) of chemical in water | Conc. ratio Cs/Cw *1) |
|---|---|---|---|---|
| Example 1 | γ-nonalactone | 207 | 188 | 1.10 |
| Example 2 | γ-decalactone | 120 | 187 | 0.64 |
| Example 3 | γ-undecalactone | 34 | 193 | 0.18 |
| Example 4 | Eugenol | 418 | 184 | 2.27 |
| Example 5 | Isoeugenol | 453 | 186 | 2.44 |
| Comp. Example 1 | Glucono-δ-lactone | <1 | <1 *2) | <0.01 |

Notes:
*1) Ratio of concentration in the steam phase/concentration in liquid water phase.
*2) Converted into 173 mg/l of gluconic acid with some decomposition into other compounds.

From Table 1, it is seen that all the chemicals tested in Examples 1 to 5 showed transference from the liquid water phase to the steam phase, indicating applicability as volatile treating agent for the steam condensate system. In contrast, Comparative Example 1 showed almost no transference of the chemical to the steam phase.

For the chemicals of Examples 1 to 5 exhibiting transference to the steam phase, a corrosion prevention test was carried out under a condition in which the condition in a practical condenser system of steam generating plant was simulated.

A 500 ml conical beaker was charged with 500 ml of deionized water, in which corrosion test pieces of a steel each having a size of 50×30×1 mm were immersed and held at room temperature. After 5 days, the test pieces were taken out and weighed after rust removal to determine the corrosion rate as the control which is referenced as Comparative Example 2. In a similar way, corrosion tests were carried out under addition of each 100 mg of each of the tested chemicals to 500 ml deionized water to determine the corrosion rate of immersed test pieces. Test results are recited in Table 2.

TABLE 2

Temperature: normal temp.
starting pH: 5.5

| | Chemicals tested | Corrosion rate (mg/dm²/day) |
|---|---|---|
| Example 1 | γ-nonalactone | 6.1 |
| Example 2 | γ-decalactone | 4.8 |
| Example 3 | γ-undecalactone | 4.6 |
| Example 4 | Eugenol | 5.6 |
| Example 5 | Isoeugenol | 4.7 |
| Comp. Example 2 | without any additive | 10.1 |

From the results given in Table 2, it is seen that all the chemicals of Examples 1 to 5 exhibit corrosion preventive effect by reference to Comparative Example 2.

COMPARATIVE EXAMPLES 3 TO 9 AND EXAMPLES 6 TO 9

To a laboratory electric boiler of a capacity of 5 liters, a softened water prepared from tap water and saturated with atmospheric oxygen at 40° C. was supplied and the boiler was operated for steam generation at a temperature of 183° C., under a pressure of 1 MPa, at a steam generation rate of 12 liters per hour with a blow rate of 10%. The generated steam was cooled to condense into a condensate which was passed, after having been cooled to 50° C., to a column. In the column, there were placed preliminarily corrosion test pieces made of SPCC steel each having a length of 50 mm, a width of 15 mm and a thickness of 1 mm, which were held under contact with the above-mentioned condensate over a period of 96 hours.

The corroded amount of test piece was determined from which corrosion rate was calculated. The so-obtained value is a parameter indicating the degree of corrosion of practical steam condensate system without any treatment with preventive agent and is referenced as Comparative Example 3 in Table 3.

Similar experiments were carried out by supplying the boiler with the softened water with addition of each of the chemicals indicated in Table 3 in such an amount as to reach the concentration in the feed water as given in Table 3.

Similar corrosion tests were carried out for the condensate obtained by operating the boiler by supplying thereto a softened water with addition of the chemical, in the same conditions as in Comparative Example 3, whereby corrosion rates were calculated. The test results are given in Table 3 as Comparative Examples 4 to 9 and as Examples 6 to 9.

TABLE 3

| | Chemicals *)/Conc. in feed water (mg/l) | Corrosion rate (mg/dm²/day) |
|---|---|---|
| Comp. Example 3 | without any additive | 197 |
| Comp. Example 4 | ODA/1 (with emulsifier) | 177 |
| Comp. Example 5 | DEEA/15 | 195 |
| Comp. Example 6 | ODA/1 and DEEA/15 (with emulsifier) | 126 |
| Comp. Example 7 | IEUG/1 | 173 |
| Comp. Example 8 | NL/1 | 175 |

TABLE 3-continued

|  | Chemicals *)/Conc. in feed water (mg/l) | Corrosion rate (mg/dm²/day) |
|---|---|---|
| Comp. Example 9 | UL/1 | 162 |
| Example 6 | IEUG/1; DEEA/12 and ERY/12 | 77 |
| Example 7 | EUG/1; DEEA/12 and ERY/12 | 79 |
| Example 8 | NL/1; DEEA/12 and ERY/12 | 93 |
| Example 9 | UL/1; DEEA/12 and ERY/12 | 65 |

Note: *)
ODA = Octadecylamine (along chain aliphatic amine)
DEEA = Diethylethanolamine (a neutralizing amine)
IEUG = Isoeugenol
EUG = Eugenol
Ery = potassium erysorbate
NL = γ-nonalactone
UL = γ-undecalactone From the results given in Table 3, it is seen that corrosion in the steam condensate system can be suppressed more effectively by using a water treating agent composed of isoeugenol, eugenol, γ-nonalactone or γ-undecalactone, plus a neutralizing amine plus erysorbic acid or salt thereof, as compared with the use of a water treating agent composed of a neutralizing amine or a long chain aliphatic amine or, further, of a combination of a neutralizing amine with a long chain aliphatic amine.

EXAMPLES 10 TO 13 AND COMPARATIVE EXAMPLES 10 TO 14

A definite amount of each of the chemicals given in Table 4 below was taken in a messcylinder and an aqueous solution was prepared therefrom, which was stood still over a period of time to observe occurrence of any deposition. On assessment after ten days, those which did not show occurrence of rough dispersion of deposits on a visual observation are marked with a symbol o and those which did show any rough dispersion of deposits are marked with a symbol x. From the results given in Table 4, it is seen that the water treating agents of Examples are superior in the solubility over those of Comparative Examples.

TABLE 4

|  | Composition of treating agent | Solubility |
|---|---|---|
| Example 10 | 2% IEUG, 20% DEEA, 20% ERY and 58% water | o |
| Example 11 | 1% IEUG, 10% DEEA, 10% ERY and 79% water | o |
| Example 12 | 1% NL, 10% DEEA, 10% ERY and 79% water | o |
| Example 13 | 1% UL, 15% DEEA, 10% ERY and 74% water | o |
| Comp. Example 10 | 10% IEUG and 90% water | x |
| Comp. Example 11 | 5% IEUG and 95% water | x |
| Comp. Example 12 | 1% IEUG and 99% water | x |
| Comp. Example 13 | 1% NL and 99% water | x |
| Comp. Example 14 | 1% UL and 99% water | x |

COMPARATIVE EXAMPLE 15 AND EXAMPLES 14 TO 16

In a constant temperature bath held at 60° C., one liter of deionized water of a pH of 6.5 was stirred for one hour so as to saturate it with atmospheric oxygen and the oxygen concentration was measured by a dissolved oxygen meter (MOCA 3600 of the firm Orbisphere Laboratories). 100 mg of potassium erysorbate were added to the water and the mixture was agitated sufficiently, before the solution was poured into a 200 ml incubation bottle to fill it completely therewith, whereupon a closure stopper was fitted into the bottle so as to exclude any rest of gas space therein and the bottle was returned to the constant temperature bath of 60° C. to subject the solution to reaction for 10 minutes. After 10 minutes, the bottle was taken out of the bath and the dissolved oxygen concentration therein was detected by the dissolved oxygen meter. The rate of removal of dissolved oxygen is calculated from the proportion of the dissolved oxygen concentration after the addition of potassium erysorbate versus the dissolved oxygen concentration before the addition of potassium erysorbate (Comparative Example 15).

Test solutions were prepared from each one liter of deionized water by adjusting the pH thereof at 7.5, 9.0 and 10.5, respectively, by adding sodium hydroxide thereto as alkali reagent. Each of these solutions was stirred for one hour in a constant temperature bath held at 60° C., in order to saturate it with atmospheric oxygen and the dissolved oxygen concentration thereof was measured by a dissolved oxygen meter (MOCA 3600 of the firm Orbnisphere Laboratories). 100 mg of potassium erysorbate were added to the water and the mixture was agitated sufficiently, before the solution was poured into a 200 ml incubation bottle to fill it completely therewith, whereupon a closure stopper was fitted into the bottle so as to exclude any rest of gas space therein and the bottle was returned to the constant temperature bath of 60° C. to subject the solution to reaction for 10 minutes. After 10 minutes, the bottle was taken out of the bath and the dissolved oxygen concentration therein was detected by the dissolved oxygen meter. The rate of removal of dissolved oxygen is calculated from the proportion of the dissolved oxygen concentration after the addition of potassium erysorbate versus the dissolved oxygen concentration before the addition of potassium erysorbate (Examples 14 to 16).

The above procedures were carried out promptly under a nitrogen atmoshere.

The test results are given in Table 5.

From the results given in Table 5, it is seen that the rate of removal of dissolved oxygen becomes greater, by elevating the pH to a value of at least 7, preferably at least 8 and more preferably at least 10, bier by addition of an alkali reagent.

TABLE 5

|  | pH of test soln. | Dissolved $O_2$ Conc. before ERY addition (mg/l) | Dissolved $O_2$ Conc. after ERY addition (mg/l) | Rate of $O_2$ remov. (%) |
|---|---|---|---|---|
| Comp. Example 15 | 6.5 | 4.30 | 3.00 | 30.1 |
| Example 14 | 7.5 | 4.30 | 2.55 | 40.7 |
| Example 15 | 9.0 | 4.30 | 1.60 | 62.8 |
| Example 16 | 10.5 | 4.30 | 0.40 | 93.0 |

Note: ERY = potassium erysorbate

COMPARATIVE EXAMPLE 16

To a laboratory electric boiler of a capacity of 5 liters, a softened water prepared from tap water and saturated with atmospheric oxygen at 40° C. was supplied and the boiler was operated for steam generation at a temperature of 183° C., under a pressure of 1 MPa, at a steam generation rate of 11 liters per hour with a blow rate of 10%. The generated steam was cooled to condense into a condensate which was passed, after having been cooled to 50° C., to a column. In the column, in the feed water line and in the boiler body, there were placed preliminarily corrosion test pieces made of a steel each having a length of 50 mm, a width of 15 mm and a thickness of 1 mm and having been treated by a nitric acid etching. The boiler was operated for 240 hours.

The corroded amounts of test pieces were determined, from which corrosion rates were calculated. The results are given in Table 6. Concurrently, amount of deposited iron oxide on the boiler inside surfaces of the heating tubes was estimated, the result of which is given also in Table 6.

COMPARATIVE EXAMPLE 17 AND EXAMPLES 17 TO 23

Experiments were carried out by supplying the boiler with a solution of each of the chemicals given in Table 6 in the above-mentioned softened water using a metering pump in such a supply rate as to reach the concentration in the feed water as given in Table 6.

Similar corrosion tests were carried out for the condensate of the generated steam, for the feed water and for the boiler water under operation of the boiler with addition of the chemicals, in the same conditions as in Comparative Example 16, whereby corrosion rates were calculated. On the other hand, amount of iron oxide deposited on the boiler inside surfaces of the heating tubes was estimated. The results are given in Table 6, wherein Examples 21, 22 and 23 refer each to an experiment in which eugenol, γ-nonalactone or γ-undecalactone, respectively, was used in the place of isoeugenol.

It is clear from Table 6 that better effects in the prevention of corrosion and in the suppression of scale deposition can be attained by a concurrent use of isoeugenol, eugenol, γ-nonalactone or γ-undecalactone together with a neutralizing amine, an erysorbate, an alkali reagent and a water-soluble polymeric compound.

INDUSTRIAL APPLICABILITY

The water treating agent and the water treating method according to the present invention can be utilized for preventing corrosion occurring in the feed water lines and in the steam-generating section of steam-generating apparatuses, such as boilers, steam generators and so on, and for suppressing formation of water scales and oxide scales on the internal surfaces of such apparatuses as well as, in particular, for preventing corrosion occurring in the steam condensate lines of such apparatuses.

What is claimed is:

1. A water treating agent, comprising at least one compound selected from the group consisting of eugenol, isoeugenol and lactones represented by the formula (1) given below; a neutralizing amine; and erysorbic acid or its salt:

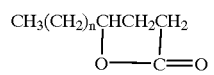
(1)

in which n is an integer of 4 to 9.

2. The water treating agent as claimed in claim 1, wherein the weight proportion of [eugenol and/or isoeugenol and/or lactone(s)]/[neutralizing amine]/[erysorbic acid or its salt] of the water treating agent is in the range from 1/0.1/0.1 to 1/500/500.

3. The water treating agent as claimed in claim 1, wherein it comprises further an alkali reagent.

4. The water treating agent as claimed in claim 3, wherein the weight proportion of [eugenol and/or isoeugenol and/or lactone(s)]/[alkali reagent] of the water treating agent is in the range from 1/0.01 to 1/500.

TABLE 6

| | Chemicals and dose amount (mg/l) | | | | | Corrosion rate (mdd) | | | Amt. (mg/cm²) of iron oxide |
|---|---|---|---|---|---|---|---|---|---|
| | IEUG | DEEA | ERY | NaOH | WSPC | Feed line | Boiler body | Condens. line | deposite on heating tube |
| Comp. Example 16 | — | — | — | — | — | 92.4 | 25.6 | 197 | 0.357 |
| Comp. Example 17 | 1 | 15 | — | — | — | 85.1 | 25.2 | 153 | 0.349 |
| Example 17 | 1 | 15 | 20 | — | — | 53.8 | 14.3 | 62 | 0.262 |
| Example 18 | 1 | 15 | 20 | 15 | — | 27.8 | 9.8 | 55 | 0.228 |
| Example 19 | 1 | 15 | 20 | — | 5 | 52.2 | 11.6 | 65 | 0.152 |
| Example 20 | 1 | 15 | 20 | 15 | 5 | 25.9 | 7.1 | 53 | 0.113 |
| Example 21 | EUG 1 | 15 | 20 | 15 | 5 | 26.1 | 7.0 | 55 | 0.115 |
| Example 22 | NL 1 | 15 | 20 | 15 | 5 | 26.3 | 6.8 | 53 | 0.116 |
| Example 23 | UL 1 | 15 | 20 | 15 | 5 | 24.8 | 7.0 | 49 | 0.121 |

Notes:
IEUG = Isoeugenol
EUG = Eugenol
DEEA = Diethylethanolamine
NL = γ-nonalactone
UL = γ-undecalactone
ERY = Potassium erysorbate
NaOH = Sodium hydroxide
WSPC = Water-soluble polymeric compound: a copolymer of acrylic acid with hydroxyallyloxy-propanesulfonic scid.

5. The water treating agent as claimed in claim 1, wherein it comprises further a water-soluble polymeric compound.

6. The water treating agent as claimed in claim 5, wherein the weight proportion of [eugenol and/or isoeugenol and/or lactone(s)]/[water-soluble polymeric compound] of the water treating agent is in the range from 1/0.01 to 1/300.

7. A water treating method, comprising introducing into the water to be treated a water treating agent comprising at least one compound selected from the group consisting of eugenol, isoeugenol and lactones represented by the following formula (1), namely,

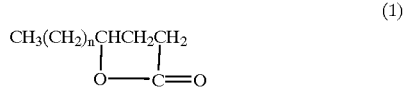
(1)

in which n is an integer of 4 to 9.

8. A water treating method, comprising introducing into the water to be treated a water treating agent comprising at least one compound selected from the group consisting of eugenol, isoeugenol and lactones represented by the formula (1) given below; a neutralizing amine; and erysorbic acid or its salt:

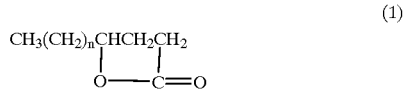
(1)

in which n is an integer of 4 to 9.

9. The water treating method as claimed in claim 8, wherein the weight proportion of [eugenol and/or isoeugenol and/or lactone(s)]/[neutralizing amine]/[erysorbic acid or its salt] of the water treating agent is in the range from 1/0.1/0.1 to 1/500/500.

10. The water treating method as claimed in claim 8, wherein the water treating agent comprises further an alkali reagent.

11. The water treating method as claimed in claim 10, wherein the weight proportion of [eugenol and/or isoeugenol and/or lactone(s)]/[alkali reagent] of the water treating agent is in the range from 1/0.01 to 1/500.

12. The water treating method as claimed in claim 8, wherein the water treating agent comprises further a water-soluble polymeric compound.

13. The water treating method as claimed in claim 12, wherein the weight proportion of [eugenol and/or isoeugenol and/or lactone(s)]/[water-soluble polymeric compound] of the water treating agent is in the range from 1/0.01 to 1/300.

14. A water treating agent for water systems subject to corrosion and scale formation in which the improvement comprises the water treating agent comprising at least one compound selected from the group consisting of eugenol, isoeugenol and a lactone represented by the following formula (1)

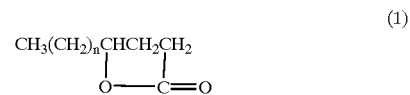
(1)

in which n is an integer of 4 to 9.

15. The water treating agent as claimed in claim 14, additionally comprising a neutralizing amine and erysorbic acid or a salt thereof.

16. A water treating agent comprising at least one compound selected from the group consisting of eugenol and isoeugenol and a lactone represented by the following formula (1)

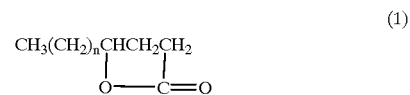
(1)

in which n is an integer of 4 to 9.

17. The water treating agent as claimed in claim 16, additionally comprising a neutralizing amine and erysorbic acid or a salt thereof.

18. A water treating method for preventing corrosion and scale formation in water systems comprising the step of introducing into water to be treated a water treating agent comprising at least one compound selected from the group consisting of eugenol, isoeugenol and a lactone represented by the following formula (1)

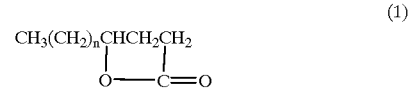
(1)

in which n is an integer of 4 to 9.

19. The water treating method as claimed in claim 18, wherein the water treating agent additionally comprises a neutralizing amine and erysorbic acid or a salt thereof.

20. The water treating method as claimed in claim 18, wherein the water treating agent comprises at least one compound selected from the group consisting of eugenol and isoeugenol and a lactone represented by the following formula (1)

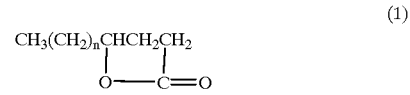
(1)

in which n is an integer of 4 to 9.

* * * * *